United States Patent [19]

Sharp

[11] 4,379,490
[45] Apr. 12, 1983

[54] METHOD FOR REMOVAL OF ASPHALTENE DEPOSITIONS WITH AMINE-ACTIVATED DISULFIDE OIL

[75] Inventor: Shelby P. Sharp, Tulsa, Okla.

[73] Assignee: Standard Oil Company (Indiana), Chicago, Ill.

[21] Appl. No.: 256,430

[22] Filed: Apr. 22, 1981

[51] Int. Cl.$^3$ ............................................. E21B 43/25
[52] U.S. Cl. .................. 166/304; 166/305 R; 166/371; 134/40; 252/855 B
[58] Field of Search ............. 134/40; 166/304, 305 R, 166/312, 371; 252/8.55 B, 8.3

[56] References Cited

U.S. PATENT DOCUMENTS

| | | | |
|---|---|---|---|
| 3,241,614 | 3/1966 | Bertness | 166/304 |
| 3,314,999 | 4/1967 | Bapseres et al. | |
| 3,558,509 | 1/1971 | Wiewiorowski | 252/8.55 B X |
| 3,563,315 | 2/1971 | Claytor, Jr. et al. | 166/304 |
| 3,689,319 | 9/1972 | Sample, Jr. et al. | 134/40 |
| 3,846,311 | 11/1974 | Sharp et al. | 252/8.55 B |
| 4,290,900 | 9/1981 | Sharp et al. | 252/8.55 B |

FOREIGN PATENT DOCUMENTS 771129  11/1967  Canada ................................. 166/312

OTHER PUBLICATIONS

Brown et al., "Low-Cost Way to Treat High Mercaptan Gasoline", *The Oil and Gas Journal*, Oct. 26, 1959, vol. 57, pp. 73–78.

*Primary Examiner*—Stephen J. Novosad
*Assistant Examiner*—George A. Suchfield
*Attorney, Agent, or Firm*—Gary M. Bond; Fred E. Hook

[57] ABSTRACT

A method for treating and removing unwanted asphaltene deposits from oil and gas wells, surface equipment, flow lines, and pore spaces of oil-baring formations comprises treatment with an amine-activated aliphatic disulfide oil as an asphaltene solvent. In a preferred aspect, the aliphatic disulfide oil is a dialkyl disulfide oil and is activated by the addition of 10 weight percent of diethylamine. In a specific use, the activated disulfide oil is used to remove asphaltene deposits from an oil-bearing formation and a producing well penetrating the formation.

15 Claims, No Drawings

METHOD FOR REMOVAL OF ASPHALTENE DEPOSITIONS WITH AMINE-ACTIVATED DISULFIDE OIL

BACKGROUND OF THE INVENTION

1. Field of the Invention

The present invention relates to an asphaltene solvent system for use in oil and gas wells. More particularly, it is concerned with an amine-activated dialkyl disulfide oil capable of dissolution of asphaltene deposits in an oil-bearing formation and producing well.

2. Description of the Prior Art

The deposition of asphaltenes during production or processing of oil from oil-bearing formations, and the problems associated with such deposition, for example, plugging of the formation, of the casing or tubing string, fouling of the surface equipment, or reduction in the desired flow of crude oil, are all well known. Whenever a crude oil contains high concentrations of asphaltenes, safeguards to inhibit the precipitation of asphaltenes and methods to remove unwanted asphaltene depositions during production or processing are employed.

Various methods have been employed for removal of asphaltene deposits including the use of solvent compositions to contact and dissolve the asphaltenes, and physical methods such as scrapping or treatment with hot petroleum oils. Additionally, carbon disulfide has been employed as a solvent for removal of asphaltene deposits from oil-bearing formations.

However, all of the above methods suffer from various deficiencies and have achieved only limited commercial success. For example, carbon disulfide is extremely hazardous and due to its low flash and auto-ignition points, its use is virtually precluded despite being one of the most effective asphaltene solvents known. The use of other known asphaltene solvents, such as stable halogenated organic compounds, in oil-bearing formations is also not preferred because of the risk of solvent carryover to the refinery where the solvents can poison cracking catalysts. Methods such as those disclosed in U.S. Pat. No. 3,689,319, issued to T. E. Sample, et al. on Sept. 5, 1971, and entitled "Paraffin Removal Process", suffer in that such methods are expensive thereby lessening the likelihood of their commercial use.

In view of the urgency of the energy supply situation in this country, treatment of asphaltic crude oil formations will become more desirable and necessary in the future. Hence, an economical, effective method for treatment of these formations to remove asphaltene deposits is necessary.

SUMMARY OF THE INVENTION

According to the invention is a method comprising contacting asphaltene deposits with an amine-activated disulfide oil. The method can be used to remove asphaltenes from producing wells, formations, injection wells, flowlines, and surface production equipment, for example, separators and the like, and refining equipment. According to a specific aspect of the invention, the disulfide oil is activated with diethylamine. In a further aspect the amine-activated disulfide oil is allowed to soak into the formation by shutting in the treated well for a desired time period after treatment before returning the well to production.

DESCRIPTION OF THE PREFERRED EMBODIMENTS

Disulfide oils useful as a starting material in the preparation of the improved asphaltene solvent employed in the instant invention involve a pair of aliphatic or aryl radicals (R and R') bonded to a disulfide unit as represented in the formula R-S-S-R'. Where the aliphatic radicals present in the disulfide oil are alkyl radicals, such compounds are referred to in the chemical literature as alkyl disulfides. The terms alkyl disulfides and dialkyl disulfides should be considered equivalent for purposes of the instant invention. It is not necessary that an alkyl disulfide oil be employed as the starting material, but the use of an alkyl disulfide is preferred as they are readily available. For convenience, the term dialkyl disulfide oil will be used hereafter to describe any aliphatic disulfide oil.

The individual dialkyl disulfide used may include, for example, such compounds as dimethyl disulfide, diethyl disulfide, dioctyl disulfide, ditertiary tetradecyl disulfide, methyl ethyl disulfide and the like. A particularly useful disulfide oil is a mixture of aliphatic disulfides in which the aliphatic group therein contains from about 2 to about 11 carbon atoms, e.g. $(C_2H_5S)_2$, $(C_{11}H_{23}S)_2$, etc., and are typically those disulfide mixtures produced as a product stream of the Merox ® process described in the *Oil and Gas Journal*, Vol. 57, pages 73–78, Oct. 26, 1959. These mixture can be produced by contacting a refinery hydrocarbon stream containing aliphatic mercaptans with a caustic solution to produce the corresponding sodium salts of the mercaptans. The sodium salts can then be converted to dialkyl disulfides by air oxidation which simultaneously regenerates the caustic.

The asphaltene solvent used in the method of the instant invention further comprises addition of an amine to the dialkyl disulfide oil in order to produce an amine-activated dialkyl disulfide oil. The addition of the amine to the dialkyl disulfide oil is the same as known amine activation of dialkyl disulfides in order to produce sulfur solvents. Examples of these processes are described in U.S. Pat. Nos. 3,314,999 and 3,846,311.

It has been previously noted that methods for the activation of the dialkyl disulfide oil with amines treat the $C_4$–$C_{12}$ alkyl amines as uniquely suitable for such purposes; and dialkyl disulfide oils activated by any of such amines are suitable for use in the instant invention. Examples of these amines are diethylamine, dipropylamine, 2-ethyl hexylamine, butylamine, hexylamine, octylamine, dodecylamine, and the like. It is also possible to activate the dialkyl disulfide oil for use in the method of the instant invention with higher molecular weight or fatty amines. These higher molecular weight amines can include amines such as di- and triamines.

An amount of the amine employed to activate the disulfide asphaltene solvent is from 5 to 20 percent or even higher, preferably from about 5 to about 10% since amounts in this range are effective and commercially economical. In a preferred embodiment, 10 weight percent diethylamine is used to activate the dialkyl disulfide oil used in the present invention. Diethylamine is currently preferred because of its effectiveness, availability, and low cost, although as indicated other amines can also be employed.

It is also preferable that the activated disulfide oil be aged. By aged, it is meant that the amine has been incorporated into the disulfide oil a period of 20–90 days before use or that, after addition of the amine, the amine-disulfide mixture be heated to about 100° F. for a shorter aging period. However, it is not a requisite that the activated disulfide oil be aged at all.

In an aspect of the invention, an oil-bearing formation is treated by injecting amine-activated dialkyl disulfide oil into a producing well penetrating the formation. The disulfide oil is then displaced into the formation by injecting a displacing agent, which is typically a light solvent such as diesel oil, condensate, Dowell P-121 ® 15% aromatic solvent, or the like. The displacing agent used can also be water or brine. It is preferrable to employ a combination of displacing agents, by first injecting a portion of light solvent, such as condensate, and then injecting water behind the solvent. This procedure is preferred because it reduces the cost of the displacement. After displacement into the formation, the well is shut in to allow dissolution of the asphaltenes. The shut-in period can be of any length though a preferable one is about 12 hours. It is also not a rigid requirement that the well be shut in at all as the rate of asphaltene dissolution by the disulfide oil of the instant invention may be fast enough that a "soak" period is not needed. After the shut-in period, the well is then returned to production.

An additional step that can be utilized in the method of the instant invention is injecting an additional amount of the displacing agent after the shut-in period is completed but before the well is returned to production, and shutting the well in for another time period of any length. After the final shut-in period, the well is then returned to production.

Any method for treating a formation can be employed to treat with the asphaltene solvent of the invention. The oil-bearing formation and producing well penetrating the formation can be treated, for example, with the amine-activated disulfide oil asphaltene solvent by any of several well known well treating methods. Such methods include acidizing methods and the methods used to contact asphaltene deposits with other solvents.

Treatment with the activated disulfide oil of the invention is also useful to remove precipitated asphaltenes from an injection well penetrating an oil-bearing formation or from surface production equipment contacted with asphaltic crudes. Treatment of the injection well is done by a method such as that for a production well, while treatment of surface equipment would merely involve contacting asphaltene deposits with the disulfide solvent.

In the method of the invention, the asphaltene deposit is contacted with an amount of activated disulfide oil effective to remove at least a portion of the asphaltene deposit. The effective amount of the activated disulfide solvent used for treatment will depend upon the geometry of the well to be treated, the size of the well casing and tubing, whether the formation itself is to be treated, the producing rate of the well, and the percent asphaltene concentration. The geometry of the well is used to calculate the volume of disulfide oil necessary to fill the well tubing to permit contacting any asphaltene deposits present in the tubing. Thus, deeper wells will obviously require more disulfide oil. In addition, if the formation is desired to be treated, the amount must be large enough to fill and treat the tubing and to be displaced into the formation to the desired depth. An effective amount will thus vary but will normally be at least 3 barrels of the disulfide oil, though it is possible that a lesser amount will be effective.

Preferably, the effective amount will be the least amount needed to significantly improve the well's production. As asphaltene deposition is a recurring problem, it is preferable that successive treatments of the same well use smaller treating quantities to determine the minimum effective amount for a given well.

To confirm the ability of an amine-activated disulfide oil to dissolve asphaltenes, the following examples are provided.

EXAMPLE I

A 100 gram portion of disulfide oil mixture from a Merox ® process obtained from Warren Petroleum Company's Baytown refinery in Mount Belview, Tex., was mixed in the laboratory with 28 mililiters (19.9 grams) of diethyl amine in a 500 mililiter flask and, when heated to a temperature of about 180° to 200° F., completely dissolved 8 grams of asphaltene. The asphaltenes tested had been recovered from a crude oil from the Fourbear field near Powell, Wyoming, by the standard ASTM D-893 procedure. The results of this laboratory test encouraged Applicant to consider use of the amine-activated dialkyl disulfide oil as an asphaltene solvent in a producing petroleum well.

EXAMPLE II

The amine-activated disulfide oil and the method of the invention were tested in the Fourbear Tensleep Well No. 21 in Park County, Wyo. The Tensleep formation is the oil-bearing formation in Well No. 21, is located at about 3000-3400 feet, and has a temperature of about 140 deg. F. Well No. 21, before treatment by the method of the instant invention, was producing at a rate of 2 barrels of oil per day and one barrel of water per day. The crude produced from this well has an asphaltene content of 10.65 weight percent. The production history of No. 21, after its discovery and first production in 1959, shows a history of problems of asphaltene deposition. Previous treatments with various solvents such as 75% aromatic light oil, white cycle oil, and gas condensate had not been effective. For example, treatment with 3000 gals of a lightweight solvent (75% aromatic) failed to increase the oil production rate after treatment. A later treatment with light cycle oil improved production from 7 barrels of oil per day to 15 barrels of oil per day, and treatment with a drip gas condensate improved production from 16 barrels of oil per day to 27 barrels of oil per day.

The well was treated in the following manner. The producing interval in No. 21 contains three sets of perforations, two sets covering separate 10 foot intervals, and the last set covering a 15 foot interval. All three sets of perforations were treated with diethylamine-activated disulfide oil. The procedure used in the art in acidizing wells was used in the testing of the method of the instant invention; and a bridge plug and packer arrangement to isolate in succession each set of perforations was employed.

The disulfide oil used was the same as set forth in Example I and was activated with about 10 weight percent diethylamine. The amine was added to the disulfide oil about one month before the test. Three barrels of this disulfide oil was employed as follows: fifty gallons of the activated disulfide oil was pumped into the lower set of perforations (10 foot interval); the packers of the bridge plug and packer arrangement were moved; 65 gallons of the activated disulfide oil was pumped into the middle set of perforations (15 foot interval); the packers were relocated; and 50 gallons of the disulfide oil was pumped into the upper set of perforations (10 foot interval). The packers were reset and the disulfide oil was then displaced into all perforations by injecting 18 barrels of Dowell P-121 ® 15% aromatic solvent, and then injecting 2 barrels of water, as a combination of displacing agents. The well was then shut in overnight. The next day, an additional 18 barrels of water was injected into the 3 sets of perforations. The well was again shut in overnight to allow the disulfide oil to react and disperse. The well was then returned to production the next day with a resulting production rate of 40 barrels of oil per day. The production rate 5 days after treatment was 65 barrels of oil per day.

The large increases in oil production is considered a great advantage of the use of the asphaltene solvent of the invention. It was predicted that the production rate after treatment would be approximately 20 barrels of oil per day, and the treatment's results far exceeded the predictions.

A further advantage of the disulfide oil used in the method of the instant invention is that the treatments are highly economical as the disulfide oil is a waste product from standard refinery processing, and supplies of it are thus ample and readily available. For example, payout time of the test treatment was found to be only 10 days. This is a large advantage over previous asphaltene solvents because subsequent treatments to remove additional asphaltene accumulations are usually necessary.

Having thus described the invention it is not to be construed as limited to the particular forms disclosed and tested since these are to be regarded as illustrative rather than restrictive. The following claims are intended to cover all processes not departing from the scope and spirit of the use of the instant invention.

I claim:

1. A method for treating an asphaltene deposit comprising contacting the asphaltene deposit with an amine-activated dialkyl disulfide oil.

2. The method of claim 1 wherein said amine-activated dialkyl disulfide oil is employed to remove asphaltenes from an injection well.

3. The method of claim 1 wherein said amine-activated dialkyl disulfide oil is employed to remove asphaltenes from surface petroleum production equipment.

4. The method of claim 1 wherein said amine-activated dialkyl disulfide oil is employed to remove asphaltenes from surface production equipment.

5. A method for treating an asphaltene deposit in an oil-bearing formation and a producing well penetrating said formation comprising contacting the asphaltene deposit with an amine-activated dialkyl disulfide oil.

6. The method of claim 5 comprising:
    (a) injecting the amine-activated dialkyl disulfide oil into said well penetrating said formation;
    (b) displacing said amine-activated dialkyl disulfide oil into said formation;
    (c) shutting said well in for a time period; and
    (d) returning said well to production.

7. The method of claim 6 wherein said time period is about 12 hours.

8. The method of claim 6 wherein said amine-activated dialkyl disulfide oil comprises a diethylamine-activated dialkyl disulfide oil.

9. The method of claim 6 further comprising, after Step (c) is performed but before Step (d) is commenced, injecting an additional amount of a displacing agent into the formation and shutting in the well for an additional time period.

10. A method for treating an asphaltene deposit comprising contacting the asphaltene deposit with an amine-activated dialkyl disulfide oil in an amount effective for removal of at least a portion of the asphaltene deposit.

11. The method of claims 1, 5 or 10 wherein the amine-activated dialkyl disulfide oil comprises a dialkyl disulfide oil activated by diethylamine.

12. A method for treating asphaltene deposits in an oil-bearing formation comprising:
    (a) injecting an amine-activated dialkyl disulfide oil into a well penetrating said formation;
    (b) displacing said amine-activated dialkyl disulfide oil into said formation;
    (c) shutting said well in for a time period; and
    (d) returning said well to production.

13. The method of claim 12 further comprising, after Step (c) is performed but before Step (d) is commenced, injecting an additional amount of a displacing agent into the formation, and shutting in the well for an additional time period.

14. The method of claim 12 wherein said amine-activated dialkyl disulfide oil comprises a diethylamine-activated dialkyl disulfide oil.

15. The method of claim 12 wherein said time period is about 12 hours.

* * * * *